United States Patent
Lange (10) Patent No.: US 8,802,176 B2
(45) Date of Patent: Aug. 12, 2014

(54) EDIBLE BAKING LINER

(76) Inventor: Scott A. Lange, Homer Glen, IL (US)

( * ) Notice: Subject to any disclaimer, the term of this patent is extended or adjusted under 35 U.S.C. 154(b) by 172 days.

(21) Appl. No.: 13/566,270

(22) Filed: Aug. 3, 2012

(65) Prior Publication Data

US 2012/0294997 A1 Nov. 22, 2012

Related U.S. Application Data

(63) Continuation-in-part of application No. 12/861,054, filed on Aug. 23, 2010, now abandoned.

(60) Provisional application No. 61/293,826, filed on Jan. 11, 2010.

(51) Int. Cl.
  *A23G 3/02* (2006.01)
  *A23L 1/0522* (2006.01)
  *A47J 36/02* (2006.01)
  *A23L 1/00* (2006.01)
  *A21B 3/13* (2006.01)
  *A47J 36/00* (2006.01)

(52) U.S. Cl.
  CPC .............. *A23L 1/0522* (2013.01); *A47J 36/022* (2013.01); *A23L 1/0067* (2013.01); *A21B 3/13* (2013.01); *A47J 36/00* (2013.01)
  USPC .......................................... 426/512; 426/138

(58) Field of Classification Search
  CPC ....... A47J 36/00; A47J 36/022; A23L 1/0522; A23L 1/0067; A21B 3/13
  USPC .................................................. 426/512, 138
  See application file for complete search history.

(56) References Cited

U.S. PATENT DOCUMENTS

| 2,117,266 A | | 5/1938 | Adams |
| 2,777,404 A | | 1/1957 | Halset |
| 2,833,654 A | * | 5/1958 | Sonnenshein et al. ........ 426/390 |
| 3,296,956 A | | 1/1967 | Turner |

(Continued)

FOREIGN PATENT DOCUMENTS

| DE | 1934026 | 1/1971 |
| DE | 3903004 | 4/1990 |

(Continued)

OTHER PUBLICATIONS

How to Make Poor Man's Rice Paper, online article found at http://www.ehow.com/how_6056768_make-poor-man_s-rice-paper.html, by Joanne Lewis, eHow Contributing Writer, printed Mar. 30, 2010 (2 pages).

(Continued)

*Primary Examiner* — Rena L Dye
*Assistant Examiner* — Chaim Smith
(74) *Attorney, Agent, or Firm* — Wood, Herron & Evans, LLP (57) ABSTRACT

An edible baking liner is formed from an edible paper made with large-granule vegetable starch. The liner may be baked with a baking product, and can be consumed without removing the liner from the baking product. The edible baking liner can replace the use of an inedible baking liner. In one aspect, a method of making an edible baking liner may include placing pieces of shredded edible paper into a recess of a mold, pressing an insert into the recess, and removing the formed edible baking liner from the mold.

5 Claims, 5 Drawing Sheets

(56) References Cited

U.S. PATENT DOCUMENTS

| | | | |
|---|---|---|---|
| 3,424,076 | A | 1/1969 | Bernatz et al. |
| 3,431,869 | A | 3/1969 | Frank |
| 4,313,964 | A * | 2/1982 | Dembecki .................... 426/138 |
| 4,444,799 | A | 4/1984 | Vanderveer et al. |
| 4,472,440 | A | 9/1984 | Bank |
| 4,795,652 | A | 1/1989 | Cooper |
| 4,820,533 | A | 4/1989 | Seaborne et al. |
| 4,927,656 | A | 5/1990 | Ito |
| 4,943,063 | A | 7/1990 | Moreau |
| 5,298,273 | A | 3/1994 | Ito |
| 5,376,388 | A | 12/1994 | Meyers |
| 5,425,527 | A | 6/1995 | Selbak |
| 5,484,622 | A | 1/1996 | Caden et al. |
| 5,620,757 | A | 4/1997 | Ninomiya et al. |
| 5,702,740 | A | 12/1997 | Wild |
| 5,741,505 | A | 4/1998 | Beyer et al. |
| 5,771,787 | A * | 6/1998 | Hirano .......................... 99/426 |
| 5,873,222 | A | 2/1999 | Mueller |
| 5,899,353 | A | 5/1999 | Sabin et al. |
| 5,948,313 | A * | 9/1999 | Cahen .......................... 249/160 |
| 6,060,088 | A | 5/2000 | Akimoto |
| 6,165,521 | A | 12/2000 | Mayfield |
| 6,337,097 | B1 | 1/2002 | Sun et al. |
| 6,423,357 | B1 | 7/2002 | Woods et al. |
| 6,523,306 | B1 * | 2/2003 | Gordon-Clements ............ 47/73 |
| 6,730,340 | B1 | 5/2004 | Macquarrie et al. |
| 6,902,783 | B1 | 6/2005 | Hammer et al. |
| 7,223,433 | B2 | 5/2007 | Wong et al. |
| 7,282,230 | B2 | 10/2007 | Buwalda et al. |
| 7,914,833 | B2 | 3/2011 | Buwalda et al. |
| 8,188,336 | B2 | 5/2012 | Li et al. |
| 2001/0043973 | A1 | 11/2001 | Keck et al. |
| 2003/0129280 | A1 | 7/2003 | Kiely |
| 2004/0194638 | A1 | 10/2004 | Davis |
| 2004/0198138 | A1 | 10/2004 | Vasic et al. |
| 2004/0258862 | A1 | 12/2004 | Arias Lopez |
| 2005/0031752 | A1 | 2/2005 | Koplish |
| 2005/0092763 | A1 | 5/2005 | Haggerty et al. |
| 2006/0251775 | A1 | 11/2006 | Anderson et al. |
| 2006/0251777 | A1 | 11/2006 | Koplish |
| 2007/0071854 | A1 | 3/2007 | Dowd et al. |
| 2007/0154599 | A1 | 7/2007 | Kao |
| 2007/0231441 | A1 | 10/2007 | Verrall et al. |
| 2009/0104314 | A1 * | 4/2009 | Dellinger et al. ............... 426/72 |
| 2009/0110715 | A1 | 4/2009 | Ishii et al. |
| 2009/0249751 | A1 | 10/2009 | Hyttel et al. |
| 2010/0278979 | A1 | 11/2010 | Koplish |

FOREIGN PATENT DOCUMENTS

| | | |
|---|---|---|
| GB | 2395683 | 6/2004 |
| JP | 10-28539 | 2/1998 |
| JP | 2001008651 | 1/2001 |

OTHER PUBLICATIONS

Wafer Paper, Primus Ouwel, History, [online], retrieved on Feb. 26, 2012, Retrieved from the Internet: URL<http://www.primusouwel.nl/en/index.html>.

Bulk Barn, Wafer Paper, Points of Interest, [online], retrieved on Feb. 26, 2012, Retrieved from the Internet: URL<http://www.bulkbarn.ca/en-ca/products.html?products=2078>.

Cargill, Starch, Molecular structure, [online], retrieved on Feb. 26, 2012, Retrieved from the Internet: URL<http://www.cargill.com/food/na/en/products/starches-derivatives/modified-starches/molecular-structure/index.jsp>.

* cited by examiner

EDIBLE BAKING LINER

CROSS-REFERENCE TO RELATED APPLICATION

This application is a continuation-in-part of U.S. patent application Ser. No. 12/861,054, filed Aug. 23, 2010, which claims the filing benefit of U.S. Provisional Application Ser. No. 61/293,826 (expired), filed Jan. 11, 2010, the disclosures of which are incorporated by reference herein in their entirety.

FIELD OF THE INVENTION

This invention generally relates to the use of liners in the preparation of baked goods, and more particularly to an edible liner suitable for accompanying a baked good through the baking process to become an edible part of the baked good.

BACKGROUND OF THE INVENTION

Certain bakery food products are often prepared with liners, which separate the dough or batter from the material of the baking tin or tray when the container is subjected to heat, such as within an oven, for baking.

A typical liner is a thin, sheet-like material that is either sold in the shape of the baking tin or tray, or is sold in sheets that can be shaped by the baker.

Cupcakes are one example of a confection that is often prepared with a liner. Cupcake liners are sold in a variety of paper-like materials, often in a cup shape of the same size as a conventional cupcake tin. A "batch" of cupcakes can be made by placing cupcake liners in each of the cup-shaped depressions found in a cupcake tin, then filling each liner with cake batter. After baking, each cupcake is easily removed from its depression in the tin with the cupcake liner adhering to the lower part of the confection. The cupcake can be transported intact and held cleanly by the liner. As the cupcake is consumed, the liner is peeled away and discarded.

While conventional cupcake liners are convenient for preparing and transporting cupcakes, they are inconvenient during cupcake consumption. The peeling process requires two hands and can produce crumbs and cupcake fragments. The liner itself usually contains such fragments and must be carefully handled by the fastidious consumer until it can be thrown away, generating waste.

To overcome these problems, edible paper made from rice starch has been suggested as a makeshift cupcake liner. However, rice paper becomes crispy and unappetizing when baked in this way, is vulnerable to moisture, and can very easily break apart, making it an unsatisfying substitute for conventional inedible liners.

A need therefore exists for a liner that does not have to be removed from baked goods prior to consumption, that adequately replaces conventional paper for use in the preparation and transportation of baked goods, and that provides a pleasant texture when consumed as part of a baked good.

SUMMARY OF THE INVENTION

An edible paper baking liner is disclosed which comprises large-granule vegetable matter of a sort suitable for baking and consuming along with baked goods.

Additionally, a method is disclosed for constructing a liner from edible paper comprising large-granule vegetable matter.

Additionally, a method is disclosed for preparing a baked good that uses an edible paper baking liner as an edible component of the baked good.

BRIEF DESCRIPTION OF THE DRAWINGS

The accompanying drawings, which are incorporated in and constitute a part of this specification, illustrate embodiments of the invention and, together with the Detailed Description given below, serve to explain the invention.

DETAILED DESCRIPTION

In place of traditional baking liners, in accordance with the principles of the present invention, an edible liner can be used. The liner is constructed of an edible paper material which includes vegetable starch.

In an exemplary embodiment, the vegetable starch may have an average granular size that is greater than about 10 μm. Suitable starches include potato, corn, cassava, sorghum, wheat, tapioca, arrowroot, and sweet potato starches. The vegetable starch may also be included in the edible paper through the use of any flour which contains starch of the appropriate granule size, including varieties of spelt, millet, or white flour.

In one embodiment, the edible paper may be made using a vegetable starch in conjunction with oil and water. For example, the edible liner in accordance with the present invention may be made from potato starch, water, and vegetable oil. The edible paper may be potato-based wafer paper such as is available as cake decoration equipment from bakery supplies stores.

In contrast to wood pulp paper, edible paper is a thin sheet made of food ingredients which can be consumed without harsh effects on the normal human digestive system. Because thin sheets of edible paper are made from food ingredients, edible paper is suitable to be eaten along with baked goods.

Certain varieties of edible paper made with large-granule vegetable starch are used as cake decoration supplements. Typically the paper is applied after the confection is finished baking, and may be part of a cake decoration plan including frosting and other edible and inedible decorations. Food coloring is often included in order to produce a design on the finished baked good.

Edible liners according to the present invention are suitable for receiving and holding unbaked dough or batter, and may be baked along with a baked good. During baking, a liner of the present invention may adhere to the baked good and can be suitable for consuming along with the baked good.

Figure 1:
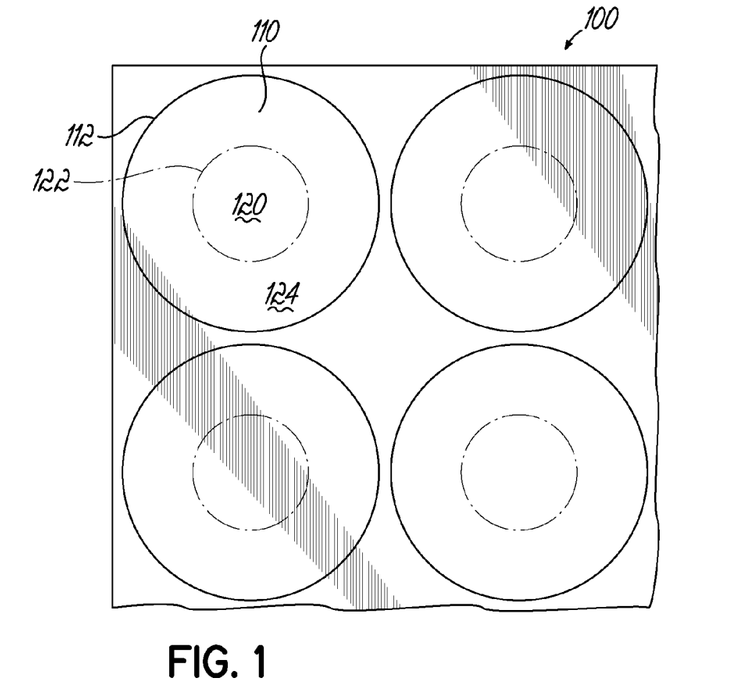
FIG. 1 is a plan view of a sheet of edible baking paper.
Figure 2:
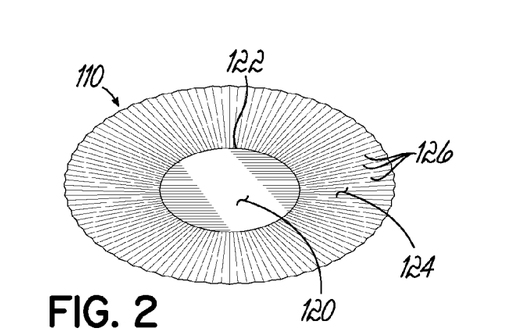
FIG. 2 is a side perspective view of an unfolded baking liner cut from the baking paper of FIG. 1.
Figure 3:
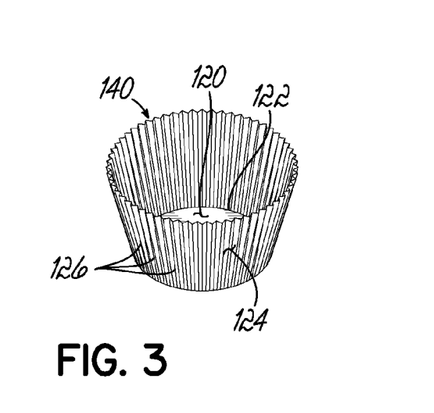
FIG. 3 is a side perspective view of the baking liner of FIG. 2, folded.

Turning now to the Drawings, wherein similar reference numerals denote similar features throughout the several Figures, as illustrated in FIGS. 1-3, multiple edible liners in accordance with an exemplary embodiment of the present invention may be constructed from a single sheet 100 of edible material as discussed above. A disk 110 is denoted by a solid line 112. The disk 110 may be removed from the sheet 100 by cutting along the solid line 112. On the surface of the disk 110 is a center region 120 which forms the bottom of the liner, and a peripheral region 124 which forms the side surface of the liner. The regions 120 and 124 are demarcated by a dashed boundary line 122. As illustrated in FIG. 3, the peripheral region 124 is folded in a direction generally orthogonal to the center region 120 in such a way as to create pleats 126 along the side surface 124. These pleats 126 may be formed by pressing the disk 110 prior to folding, or may be formed as part of folding the disk 110. The pleats 126 are a consequence of decreasing the outer diameter of the peripheral region 124 when the peripheral region 124 is folded. FIG. 3 illustrates the resulting edible baking liner 140.

Figure 4:
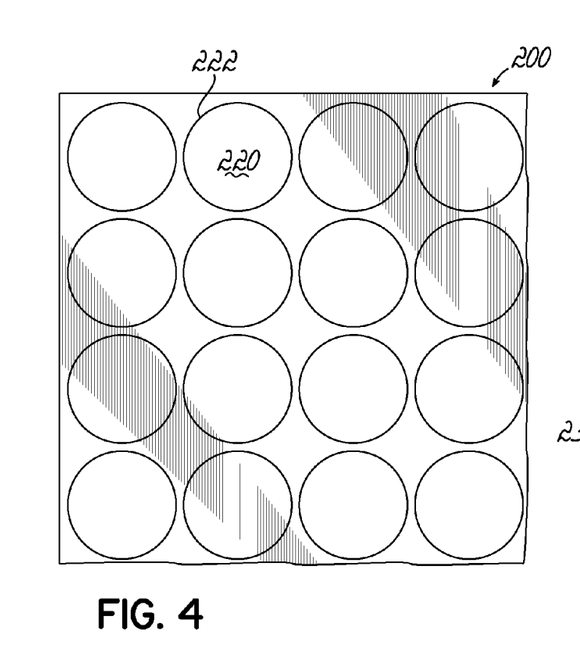
FIG. 4 is a plan view of a sheet of edible baking paper.
Figures 5, 7:
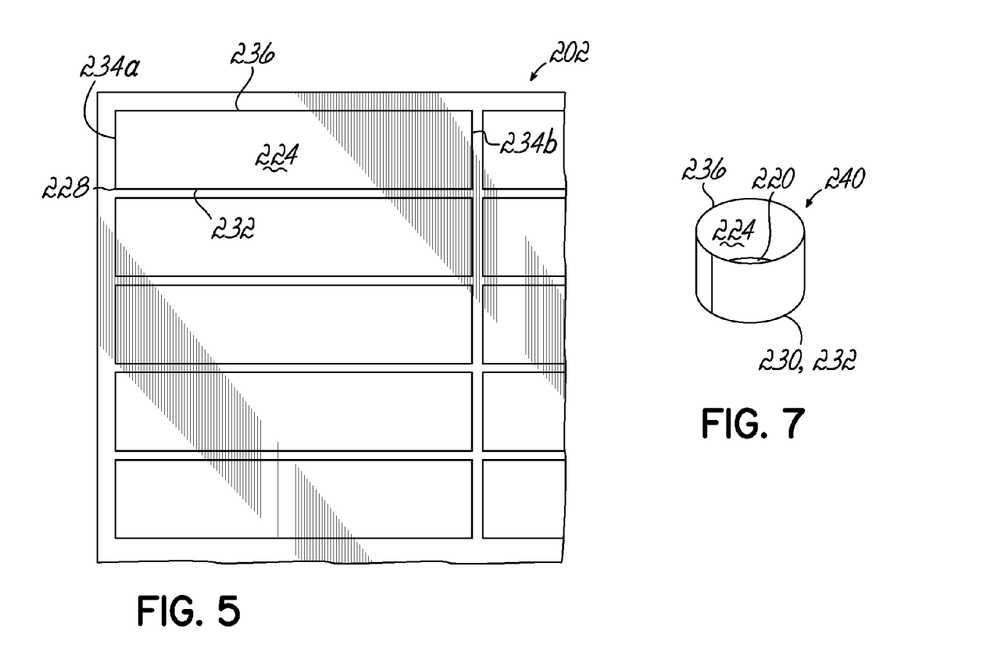
FIG. 5 is a plan view of a sheet of edible baking paper.
FIG. 7 shows the assembled baking liner of FIG. 6.
Figure 6:
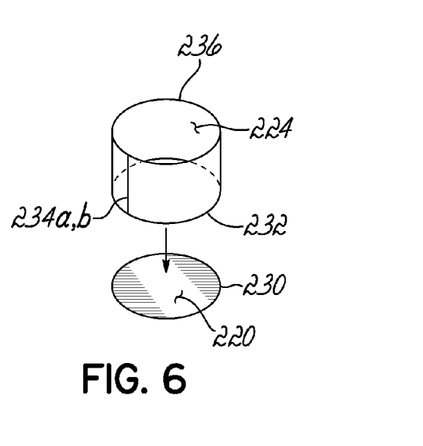
FIG. 6 illustrates a side piece of a baking liner being attached to a bottom piece of a baking cup.
Figure 8:
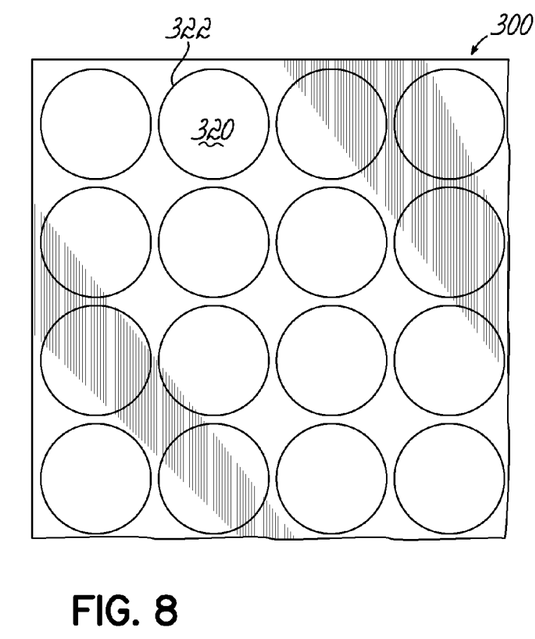
FIG. 8 is a plan view of a sheet of edible baking paper.
Figure 9:
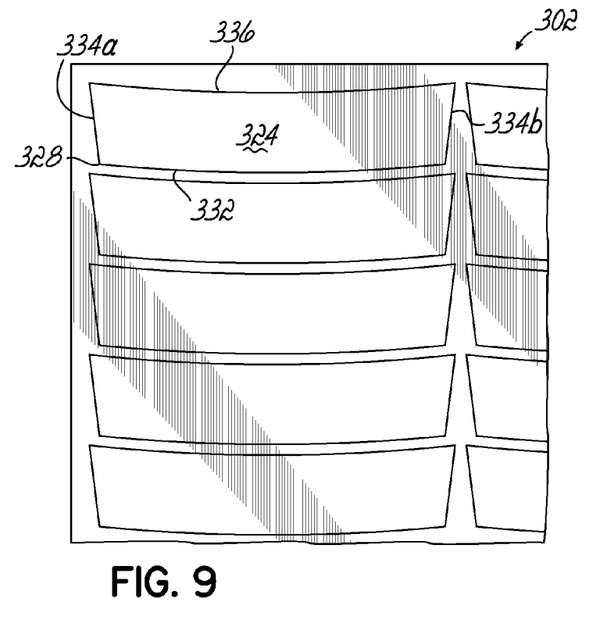
FIG. 9 is a plan view of a sheet of edible baking paper.
Figure 10:
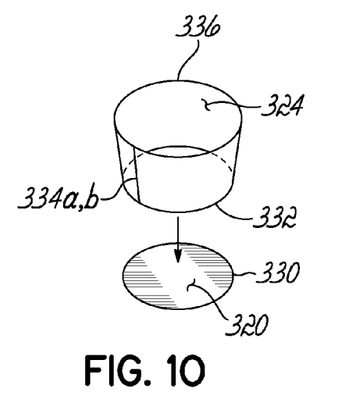
FIG. 10 illustrates a side piece of a baking liner being attached to a bottom piece of a baking liner.
Figure 11:
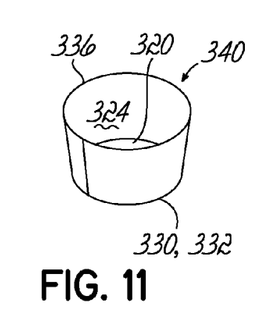
FIG. 11 shows the assembled baking liner of FIG. 10.

In another exemplary embodiment, an edible baking liner may be constructed from two or more pieces, as shown in FIGS. 4-7. FIG. 4 shows a sheet 200 of edible paper, wherein bottom pieces 220 are cut out along solid boundary lines 222, which results in the disk-shaped bottom pieces 220 having peripheral edges 230 (FIG. 6). FIG. 5 depicts a sheet 202 of edible paper wherein strips are cut out along solid boundary lines 228 to form side pieces 224. Each side piece 224 includes a base edge 232, two side edges 234a and 234b, and a top edge 236, all defined by the cuts made along boundary lines 228. The side piece 224 is assembled into a cylinder shape by attaching the side edges 234a and 234b. One of ordinary skill will understand that it may be appropriate for the side piece 224 to be created longer than the circumference of the bottom piece 220, so that some overlap is allowed to aid in attaching the side edges 234a and 234b together.

The side piece 224 is then attached to the bottom piece 220 at the edges 230 and 232. In one embodiment, water or another liquid may be used at the interface between the edges 230 and 232 in order to aid in attachment. In the embodiment shown, the base edge 232 of the side piece 224 is substantially the same length as the top edge 236, the resulting edible liner 240 has side walls that are substantially perpendicular to the bottom 220, and are not tapered.

FIGS. 8-11 illustrate another exemplary process of forming edible liners 340, similar to the process described above with respect to FIGS. 4-7, except that the side piece 324 is not rectangular but is instead shaped to allow for a tapered side 324 to the cup-shaped liner 340 when shaped and attached to the bottom piece 320. Other than the change in shape of the side piece 324 and the corresponding change in shape of the resulting cup-shaped liner 340, each of the pieces and steps explained above with respect to FIGS. 4-7 is carried out in a similar manner on the edible sheets 300 and 302; the bottom piece 320 with its peripheral edge 328 formed from cutting along the solid line 322; and the side piece 324 with its bottom edge 332, its side edges 334a and 334b, and its top edge 336 formed by cutting along the solid line 328.

Although FIGS. 1-11 depict a cup-shaped edible container, it will be appreciated that edible containers in accordance with the present invention can alternatively be formed in various other shapes and configurations. Edible liners of other shapes, such as those suitable for baking cakes, loaves, and other baked goods can be made according to the present invention. Nothing here should be construed to confine the edible liner to any particular shape or any particular baked good. A cupcake liner will be used in the discussion of the further example below, but this is, again, merely illustrative and not to be considered limiting of the invention except where specifically included in the claim language.

Figure 12:
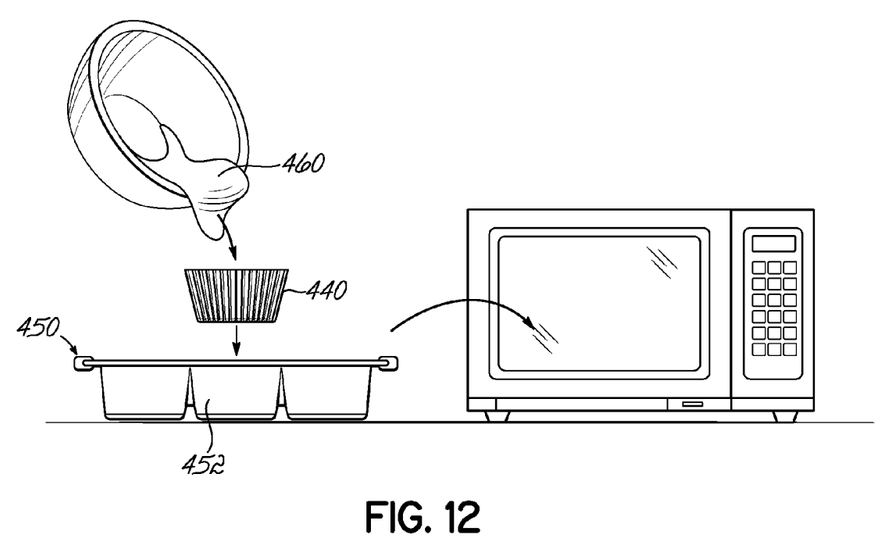
FIG. 12 illustrates a baking process using an edible liner in accordance with the present invention.
Figure 13:
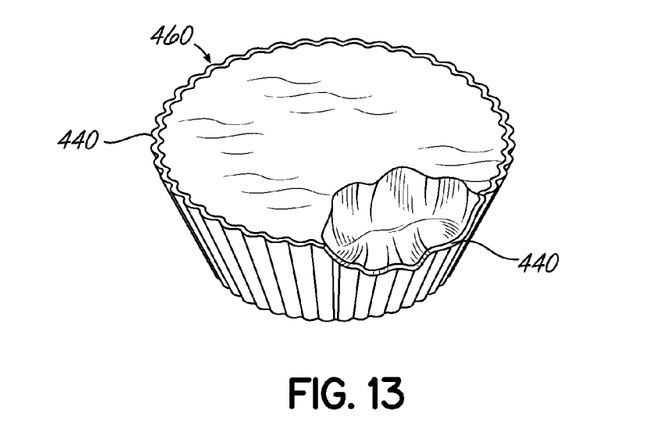
FIG. 13 shows a partially consumed cupcake with an edible liner in accordance with the present invention.

An edible baking liner, manufactured by any of the methods discussed above or by another method known to one of ordinary skill in the art, can be used to aid in the creation of a baked good as illustrated in FIGS. 12 and 13. As shown, edible baking liners 440 in the shape of cups are placed in the depressions 452 of a baking tin 450. Cupcake batter 460 is added to each liner 440, and the baking tin 450 is placed in an oven to be baked. A resulting cupcake 460 can be removed from each depression 452, each of the cupcakes now including a liner 440 that adheres to and is part of the cupcake 460. The cupcake 460 can be eaten with the liner 440.

The edible paper as described may be receptive to a variety of flavorings and food-safe colorings. It is possible to add designs to the paper which will persist through the baking process. For example, it is possible to add words or images to the paper through the use of food-safe colorings which will persist as part of the resulting baked good after the baked good and liner are baked together in accordance with the invention. Additional ingredients added to include flavors, such as confection flavors like chocolate or blueberry, are also contemplated as being within the scope of the invention. Liner flavors may be already present in the baked good or may be introduced only in the liner. Edible liners may be packaged and sold with flavors or designs already included or may be sold along with kits to allow the baker to add flavors or designs during preparation for baking.

Figure 14:
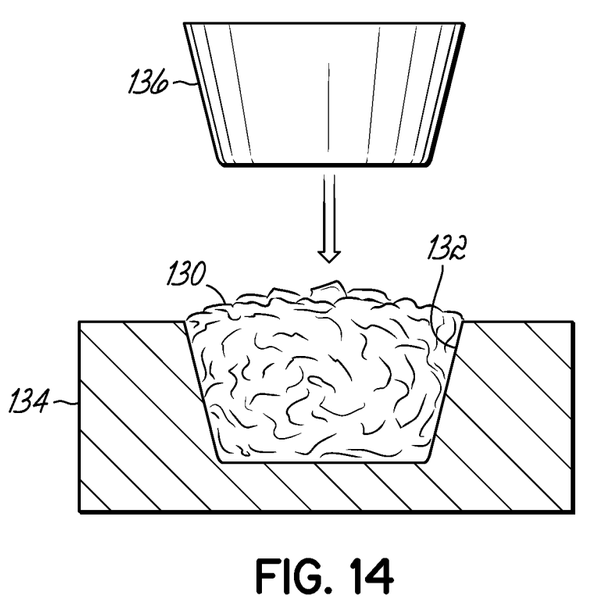
FIG. 14 illustrates another embodiment of a method for making a shaped edible baking liner in accordance with the principles of the present disclosure.

In another embodiment in accordance with the principles of the present disclosure, an edible baking liner may be formed into a desired shape, such as a cup shape similar to that depicted in FIG. 3, or any other shape suitable for use in making baked goods, by placing pieces of shredded edible paper 130 into a recess 132 of a mold 134 that defines the desired shape of the baking liner, as depicted in FIG. 14. An insert 136 may be received in the recess 132 and used to press the pieces of shredded edible paper 130 into the recess 132, with the pieces of edible paper disposed between the recess 132 and the insert 136, such that the pieces of shredded edible paper 130 become pressed together and form the desired shape. Thereafter, the formed edible baking liner may be removed from the mold 134.

Optionally, the edible baking liner may be heated, either during molding or after the desired shape has been formed. The applied heat should be sufficient to facilitate retaining the formed shape of the edible baking liner. Liquid may also be added to the pieces of shredded edible paper, to facilitate forming the baking liner into the desired shape. For example, water, oil, or any other liquid suitable to facilitate forming the shredded edible paper into a desired shape, may be used. It will be appreciated that an edible baking liner formed as described above may optionally be flavored and/or colored, as described above.

In accordance with another embodiment, good results have been obtained when forming shaped edible baking liners as described above, when the edible paper used to form the baking liners comprises a vegetable starch having a ratio of amylose to amylopectin of not more than about 19 percent.

While the present invention has been illustrated by the description of one or more embodiments thereof, and while the embodiments have been described in considerable detail, they are not intended to restrict or in any way limit the scope of the appended claims to such detail. The various features and methods described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of making a shaped edible baking liner, comprising:
   placing pieces of shredded edible paper into a recess of a mold defining the shape of the edible baking liner;
   adding liquid to the pieces of shredded edible paper;
   pressing an insert into the recess such that the pieces of shredded edible paper are disposed between the insert and the recess, thereby forming the shredded edible paper into the desired shape heating the formed edible baking liner to retain the formed shape; and
   removing the formed shaped edible baking liner from the mold.

2. The method of claim 1, further comprising:
   shredding a sheet of edible paper to form the pieces of shredded edible paper.

3. The method of claim 1, wherein the edible paper comprises vegetable starch, the vegetable starch having a granular size of more than about 10 μm.

4. The method of claim 3, wherein the vegetable starch comprises at least one of potato, corn, cassava, sorghum, wheat, tapioca, arrowroot, or sweet potato starch.

5. The method of claim 3, wherein the vegetable starch has a ratio of amylose to amylopectin of not more than about 19 percent.

* * * * *

UNITED STATES PATENT AND TRADEMARK OFFICE
CERTIFICATE OF CORRECTION

| | | |
|---|---|---|
| PATENT NO. | : 8,802,176 B2 | Page 1 of 1 |
| APPLICATION NO. | : 13/566270 | |
| DATED | : August 12, 2014 | |
| INVENTOR(S) | : Scott A. Lange | |

It is certified that error appears in the above-identified patent and that said Letters Patent is hereby corrected as shown below:

In the Specification:

Column 5,
Line 10 reads "or spirit of Applicants' general inventive concept" and should read -- or spirit of Applicant's general inventive concept --.

In the Claims:

Claim 1, Column 6,
Line 2 reads "paper into the desired shape heating the formed edible" and should read -- paper into the desired shape; heating the formed edible --.

Signed and Sealed this
Twenty-fourth Day of February, 2015

Michelle K. Lee
*Deputy Director of the United States Patent and Trademark Office*